United States Patent
Efraim et al.

(10) Patent No.: US 12,289,361 B2
(45) Date of Patent: Apr. 29, 2025

(54) PROVIDING NETWORK QUALITY OF SERVICE FOR MULTIPLE USERS

(71) Applicant: MELLANOX TECHNOLOGIES, LTD., Yokneam (IL)

(72) Inventors: Ron Yuval Efraim, Zur Hadasa (IL); Yamin Friedman, Haifa (IL); Eitan Hirshberg, Pardes Hana Karkur (IL)

(73) Assignee: Mellanox Technologies, LTD, Yokneam (IL)

( * ) Notice: Subject to any disclaimer, the term of this patent is extended or adjusted under 35 U.S.C. 154(b) by 99 days.

(21) Appl. No.: 17/338,081

(22) Filed: Jun. 3, 2021

(65) Prior Publication Data
US 2022/0394081 A1  Dec. 8, 2022

(51) Int. Cl.
*H04L 67/10* (2022.01)
*H04L 41/5003* (2022.01)
*H04L 41/5025* (2022.01)

(52) U.S. Cl.
CPC .......... *H04L 67/10* (2013.01); *H04L 41/5003* (2013.01); *H04L 41/5025* (2013.01)

(58) Field of Classification Search
CPC .. H04L 67/10; H04L 41/5003; H04L 41/5025
See application file for complete search history.

(56) References Cited

U.S. PATENT DOCUMENTS

| | | | | |
|---|---|---|---|---|
| 6,631,122 B1 * | 10/2003 | Arunachalam | ....... | H04L 47/805 370/332 |
| 7,277,938 B2 * | 10/2007 | Duimovich | ......... | H04L 41/5016 709/224 |
| 9,542,222 B2 * | 1/2017 | Mousseau | ................. | G06F 9/50 |
| 2002/0141362 A1 * | 10/2002 | Hsu | ....................... | H04L 47/522 370/333 |
| 2011/0035248 A1 * | 2/2011 | Juillard | ................. | G06F 9/5072 709/226 |
| 2015/0106520 A1 * | 4/2015 | Breitgand | ............... | H04L 43/16 709/226 |
| 2015/0378419 A1 * | 12/2015 | Berghe | .................. | G06F 9/5094 713/320 |
| 2016/0224363 A1 * | 8/2016 | Joy | ..................... | H04L 41/0895 |
| 2017/0019831 A1 * | 1/2017 | Ady | .................... | H04W 72/121 |

(Continued)

FOREIGN PATENT DOCUMENTS

| | | |
|---|---|---|
| CA | 2300697 | 12/2000 |
| CN | 1887010 | 12/2006 |

(Continued)

OTHER PUBLICATIONS

Mirhakkak et al. "Dynamic quality-of-service for mobile ad hoc networks", 2000 First Annual Workshop on MobiHOC (Cat. No. 00EX444), Aug. 11, 2000. INSPEC Accession No. 6727960. DOI: 10.1109/MOBHOC.2000.869225. (Year: 2000).*

(Continued)

*Primary Examiner* — Thomas J Dailey
(74) *Attorney, Agent, or Firm* — Sheridan Ross P.C.

(57) ABSTRACT

A system which facilitates efficient operation of plural agents, the system comprising a device which services the plural agents; and functionality which resides on the device and which provides a given quality of service, defined in terms of at least one resource, to at least one subset of agents from among the plural agents.

23 Claims, 10 Drawing Sheets

(56) References Cited

U.S. PATENT DOCUMENTS

| | | | | |
|---|---|---|---|---|
| 2017/0346705 | A1* | 11/2017 | Szilagyi | .................. H04L 43/12 |
| 2018/0097728 | A1* | 4/2018 | Bodi Reddy | ......... H04L 45/742 |
| 2018/0121247 | A1* | 5/2018 | Kaul | .................. G06F 9/45558 |
| 2018/0241842 | A1* | 8/2018 | Kumar | .................. H04L 47/805 |
| 2018/0302299 | A1* | 10/2018 | Sun | ......................... H04L 67/10 |
| 2021/0014303 | A1 | 1/2021 | Guim et al. | |

FOREIGN PATENT DOCUMENTS

| | | |
|---|---|---|
| CN | 101904140 | 12/2010 |
| CN | 107566493 | 1/2018 |

OTHER PUBLICATIONS

Chuang et al. "Stor-serv: Ading Quality-of-Service to Network Storage", Workshop on Internet Service Quality Economics, Dec. 1999 [retrieved on Jan. 7, 2023]. Retrieved from the Internet: <URL: https://citeseerx.ist.psu.edu/document?repid=rep1&type=pdf&doi=30cf493d5cf6f688396333e72c00cc5104fbd951>. (Year: 1999).*

Wang et al. "Multiagent-Based Resource Allocation for Energy Minimization in Cloud Computing Systems", IEEE Transactions on Systems, Man, and Cybernetics: Systems, vol. 47, Issue 2, pp. 205-220, Feb. 1, 2017. DOI: 10.1109/TSMC.2016.2523910. (Year: 2017).*

Cao et al. "AI Agent in Software-Defined Network: Agent-Based Network Service Prediction and Wireless Resource Scheduling Optimization," IEEE Internet of Things Journal, Jul. 2020, vol. 7, No. 7, pp. 5816-5826 (Abstract only).

Lin Na et al. "Dynamic Resource Management in DiffServ Network," Computer Engineering, Sep. 2009, vol. 35, No. 18, pp. 67-68 (with machine translation).

Official Action with Machine Translation for China Patent Application No. 202210591616.5, dated Sep. 21, 2023, 16 pages.

* cited by examiner

PROVIDING NETWORK QUALITY OF SERVICE FOR MULTIPLE USERS

FIELD

This invention relates generally to service provider devices, and more specifically to service-level agreements which are binding on service provider devices.

BACKGROUND

A service-level agreement (SLA) according to Wikipedia, "is a commitment between a service provider and a client. Particular aspects of the service—quality, availability, responsibilities—are agreed between the service provider and the service user. The most common component of an SLA is that the services should be provided to the customer as agreed upon in the contract. As an example, Internet service providers and telcos will commonly include service level agreements within the terms of their contracts with customers to define the level(s) of service being sold in plain language terms. In this case the SLA will typically have a technical definition in mean time between failures (MTBF), mean time to repair or mean time to recovery (MTTR); identifying which party is responsible for reporting faults or paying fees; responsibility for various data rates throughput; jitter".

For example, a service level agreement may specify performance metrics associated with a web service application.

Cloud computing may involve shared resources, supported by a shared infrastructure environment, Measuring, monitoring and reporting on cloud performance may be based on an end UX. Wikipedia on service level agreements expresses concern regarding "difficulty in determining the root cause of service interruptions due to the complex nature of the environment".

Network switches are described, for example, online at Wikipedia.org/wiki/Network_switch.

A network adapter, if physical, may be a component of a workstation's hardware that enables the workstation to communicate via a wired or wireless network with other nodes on the network (e.g. workstations, servers networking devices). However, a network adapter may also be A virtual network adapter or virtual NIC (network interface card) may include a logical or software instance of a physical network adapter, and may enable a physical workstation or virtual machine or other computer to connect to a wired or wireless network, thereby to communicate via the network with other nodes on the network. A virtual network adapter typically comprises a program, unlike a physical network adapter which is implemented in hardware, but both virtual and physical network adapters allow a computer to connect to a network or connect all computers on a first network e.g. wide or local area network (LAN or WAN) to a second, typically larger network e.g. the Internet.

Example virtual machines are described online, at: techterms.com/definition/virtual_machine.

SR-IOV virtual functions are described in the following online location: docs.microsoft.com/en-us/windows-hardware/drivers/networkisr-iov-virtual-functions-vfs-.

Conventional scheduling methods are described, for example, in Wikipedia's entry for "Scheduling (computing)". Network schedulers are described, for example, in Wikipedia's entry for "Network scheduler".

A conventional "Completely Fair Scheduler" is described in Wikipedia's entry on "Completely Fair Scheduler".

SUMMARY OF THE DISCLOSURE

Certain embodiments seek to provide a system, method and computer program product which facilitate efficient operation of plural agents.

Example embodiments include the following;

Embodiment 1. A system which facilitates efficient operation of plural agents, the system comprising a device which typically services the plural agents; and/or functionality which typically resides on the device and which typically provides a given quality of service, which may be defined in terms of at least one resource, typically to at least one subset of agents from among the plural agents.

Embodiment 2. A system according to any preceding embodiment wherein the quality of service is defined in terms of at least one resource $r1$, allocation of which, to at least some of the plural agents, the device which services the plural agents is not configured to control, but level of usage of which, by each of at least some of the plural agents, the device is configured to measure, and therefore to determine whether or not the level of resource $r1$ provides the given quality of service.

Embodiment 3. A system according to any of the preceding embodiments wherein said at least one resource $r1$, usage of which the device which services the plural agents are configured to measure, but the allocation of which, to the plural agents, the device is not configured to control, is varied indirectly by said functionality, by controlling another resource $r2$ whose allocation to the plural agents the device is configured to control.

Embodiment 4. A system according to any of the preceding embodiments wherein the functionality, at least once, measures how much of at least one resource $r1$ is allocated to at least one agent A from among the plural agents, identifies that an incorrect amount of resource $r1$ has been allocated to agent A considering the given quality of service, and, responsively, indirectly varies resource $r1$, by controlling resource $r2$.

Embodiment 5. A system according to any of the preceding embodiments wherein the relationship between usage of resource $r2$ by at least one agent A, with usage of resource $r1$ by said agent A, is known.

Embodiment 6. A system according to any of the preceding embodiments wherein artificial intelligence is used to learn the relationship of $r2$ with $r1$.

Embodiment 7. A system according to any of the preceding embodiments wherein the known relationship of $r2$ with $r1$ is that $r1$ is, at least in some known conditions, a decreasing function of $r2$ such that, at least given said known conditions, when $r2$ increases, $r1$ decreases, and when $r2$ decreases, $r1$ increases.

Embodiment 8. A system according to any of the preceding embodiments wherein the known relationship of $r2$ with $r1$ is that $r1$ is, at least in some known conditions, an increasing function of $r2$ such that at least given said known conditions, when $r2$ increases, $r1$ increases and when $r2$ decreases, $r1$ decrease.

Embodiment 9. A system according to any of the preceding embodiments wherein said functionality which provides QoS to at least one subset of agents, at least once dynamically computes said relationship, and modifies at least one QoS parameter accordingly.

Embodiment 10. A system according to any of the preceding embodiments wherein said functionality which provides QoS to at least one subset of agents uses at least one heuristic and modifies at least one QoS parameter accordingly.

Embodiment 11. A system according to any of the preceding embodiments wherein said resource which the device is configured to measure, but is not configured to control, comprises PPS.

Embodiment 12. A system according to any of the preceding embodiments wherein said resource which the device is configured to control comprises bandwidth.

Embodiment 13. A system according to any of the preceding embodiments wherein at least one of said agents comprises a virtual machine.

Embodiment 14. A system according to any of the preceding embodiments wherein at least one of said agents comprises a physical computer.

Embodiment 15. A system according to any of the preceding embodiments and wherein the device comprises a switching device which includes a physical network switch on which the functionality resides.

Embodiment 16. A system according to any of the preceding embodiments and wherein the device comprises a switching device which includes a virtual network switch on which the functionality resides.

Embodiment 17. A system according to any of the preceding embodiments wherein the quality of service includes a minimum amount of the resource, which is always provided to each agent in a given subset of said plural agents.

Embodiment 18. A system according to any of the preceding embodiments wherein the quality of service includes a maximum amount of the resource, which the amount of the resource used by each agent in a given subset of said plural agents, must not exceed.

Embodiment 19. A method which facilitates efficient operation of plural agents operating in conjunction with a device which services the plural agents, the method comprising:
providing functionality which resides on the device and which provides a given quality of service; and
using said functionality to provide quality of service defined in terms of at least one resource, to each individual agent from among the plural agents, wherein the quality of service is defined in terms of at least one resource r1, allocation of which, to at least some of the plural agents, the device cannot control, but level of usage of which, by each of at least some of the plural agents, the device is configured to measure, and therefore to determine whether or not the level of resource r1 provides the given quality of service, and wherein said quality of service is provided when the at least one resource r1, is varied indirectly by said functionality, by controlling another resource r2 whose allocation to the plural agents the device is configured to control.

Embodiment 20. A system according to any of the preceding embodiments wherein the relationship of r2 with r1 is known to the functionality, thereby to define a known relationship of r2 with r1.

Embodiment 21. A system according to any of the preceding embodiments wherein the known relationship of r2 with r1 is that r1 is, at least in some known conditions, an increasing function of r2, such that at least given said known conditions, when r2 increases, r1 increases, and when r2 decreases, r1 decreases.

Embodiment 22. A system according to any of the preceding embodiments wherein at least one of said plural agents comprises a network port.

Embodiment 23. A system according to any of the preceding embodiments wherein at least one QoS property is defined in common, for all agents in a subset of agents, where the subset includes less than the total number of agents in the system.

Embodiment 24. A system according to any of the preceding embodiments wherein resource r2 is used by all tasks from all agents in the system.

Certain embodiments seek to provide an improved network adapter and/or switch and/or DPU and may include software which resides in any suitable layer of the adapter SW. It is appreciated that a single network adapter and/or switch and/or DPU (data processing unit) may be shared by plural users or agents, for example by plural virtual functions e.g. plural SR-IOV virtual functions. Traditionally, quality of service between the users or agents is defined by an administrator using minimal and maximal network bandwidth, which should satisfy an SLA between the user or agent and the virtualization provider. However, the network bandwidth may not be the only limited resource which requires Quality of Service (QoS) definition. Alternatively or in addition, the limited resources may be implementation specific and/or vendor specific, and therefore cannot be directly managed by an administrator, or defined in the SLA. Alternatively or in addition, tasks performed by agents, may differ in characteristics, e.g. packet size, required offloads, etc. Thus, an administrator cannot statically allocate resources for each agent in advance, and the adapter cannot consider all required resources when a task is scheduled for execution. Alternatively or in addition, agents often do not excel in providing accurate information on the tasks they will use. Alternatively or in addition, the actual resource(s) which will become a bottleneck cannot be known in advance, and even if the actual resource(s) which will become a bottleneck are known in advance or learned, the bottleneck may change over time, such that a QoS scheme based on a single resource is less advantageous than embodiments herein.

The scheduling policy may refer to (or be expressed in terms of) both types of resources, i.e. both of r1 and r2 (each of these types may number one resource or more). For example, the scheduling policy may define min BW and/or max BW and may also define min Packets per Second (PPS) and/or max PPS. Using embodiments herein, a policy for resource/sr1 which are measurable, but not controllable, may be implemented implicitly or indirectly, by controlling resource/s r2 whose allocation/s to agents is/are controllable by the system. Alternatively or in addition, embodiments herein may be used to implement the policy for both types of resources (both for r1-type resource/s and for r2-type-resource/s, and this may be both at the same time.

Example: when computing MaxR2=minimum(OrigMaxR2, MaxR1) the system does not merely relate to R1 information, and instead relates to R2 requirements at the same time.

It is appreciated that at each point in time, a different bottleneck may be encountered. According to certain embodiments, an administrator may define more than one SLA-type property aka QoS properties (e.g. min/max Bandwidth (BW), min/max Packets per Second (PPS)), and the adapter may, responsively, apply the SLA using QoS based on one device-supported resource (BW), while only monitoring, aka measuring, the usage of the other resources. periodically or continuously, the adapter may assess if the SLA is met, and may measure utilization of the resources.

The resource allocation may change accordingly, to meet the SLA, and/or to improve resource utilization e.g. if the SLA is already met.

According to certain embodiments, resource consumption per agent is monitored, aka measured. In at least one instance when QoS requirements (SLA) are not maintained, QoS properties (say, of bandwidth) are modified e.g. either relaxed or tightened, whichever direction improves SLA adherence and/or overall resource usage. The QoS modification algorithm may be enhanced using artificial intelligence, aka AI.

This may be advantageous inter alia because hardware QoS typically requires direct management (aka hardware-based control) of used resources per {agent, job}, whereas certain embodiments herein extend QoS capabilities even lacking the ability to directly manage resources, relying instead on an ability to monitor or measure usage of such resources, by various agents.

Thus, an NIC (network interface card), say, or other device, which is only inherently able to offer bandwidth (say) QoS parameters, or whatever QoS parameters the device is configured to control, may, due to embodiments herein, offer PPS (say—or other measurable but not controllable) QoS parameters, either alternatively or in addition to the QoS parameters the device is inherently able to offer.

The term network switch used herein includes any network switch described in the Wikipedia entry on "Network Switch".

Any network switch herein may or may not be implemented in a network adapter. The network adapter (if any) may or may not be in the computer hardware. Alternatively, a virtual NIC may be provided.

DETAILED DESCRIPTION OF CERTAIN EMBODIMENTS

A system which facilitates efficient operation of plural agents is now described. The system typically operates in conjunction with a device which services plural agents, such as a scheduler or switching device which schedules or switches between plural agents. The system may include functionality, which may reside on the device servicing the agents, and which provides a given quality of service, defined in terms of at least one resource, to at least one subset of agents from among the plural agents. Each subset includes less than all of the total number of plural agents.

It is appreciated that the agents may each comprise a virtual machine or a physical computer. Also, there may be plural applications with arbitration between them e.g. using an arbiter as defined in en.wikipedia.org/wiki/Arbiter (electronics).

FIGS. 1-6 illustrate example embodiments. In many of the example embodiments, the number of agents is shown to be three—merely for simplicity and by way of example; any other number of agents, however, may be provided, such as two or four, or any much larger number of agents, such as a few dozen, or a few hundred or more agents.

Figure 1:
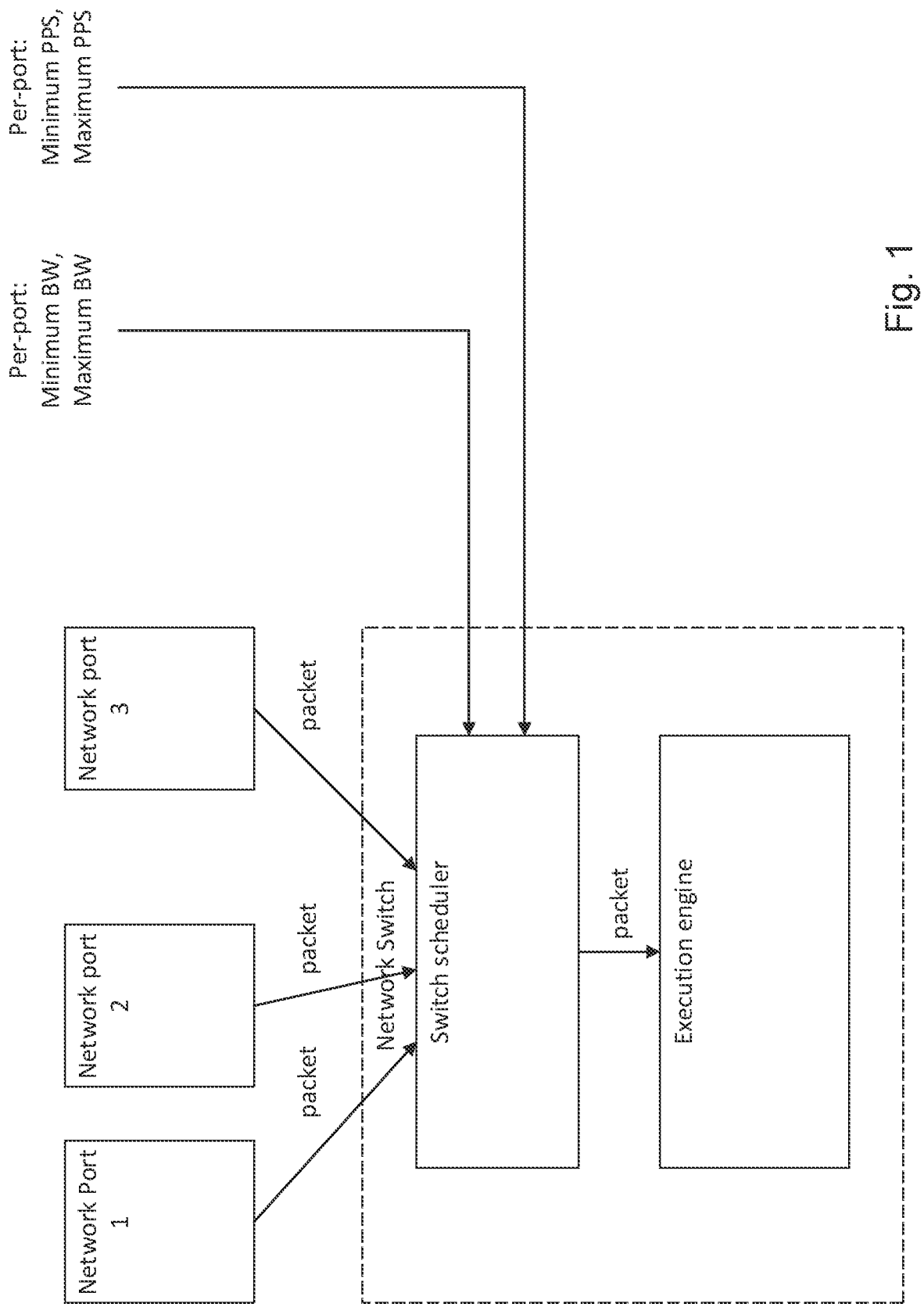
FIGS. 1-10 are simplified block diagram illustrations of respective embodiments of the present invention.

In FIG. 1, in which the agents are network ports, the device housing the system may be a network switch, which may be virtual or physical. The network switch may or may not be implemented in the network adapter (and/or DPU). The network adapter, if any, may be in the computer hardware, or there may be a virtual NIC. The execution engine of FIG. 1 may comprise any suitable packet execution pipeline logic. This may include all or any subset of the following elements: packet parsing and/or packet classification, and/or packet header modification, and/or statistics collection, and/or packet transmission.

More generally, switching may be done by a CPU, and not by a network switch.

Figure 2:
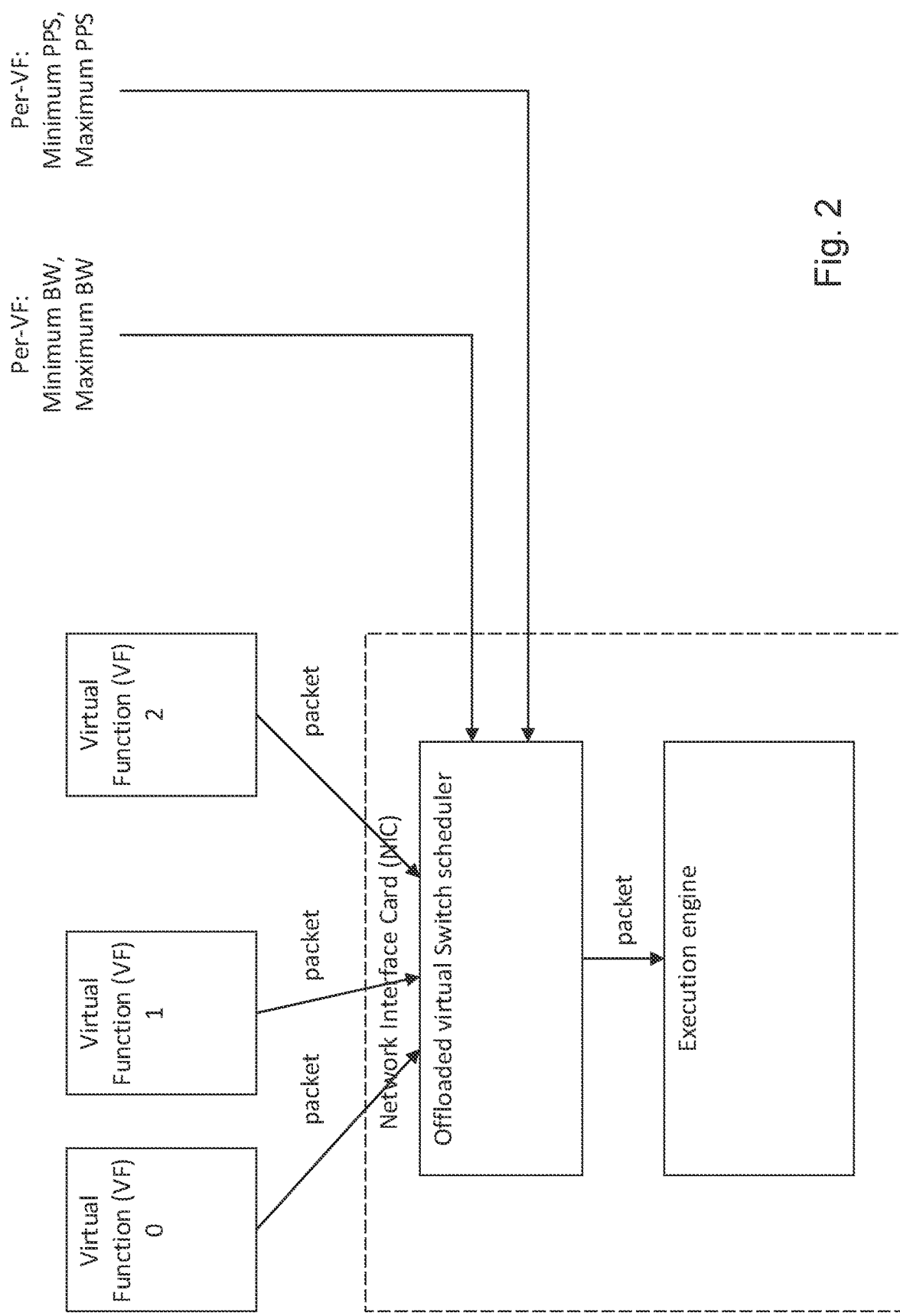
Figure 3:
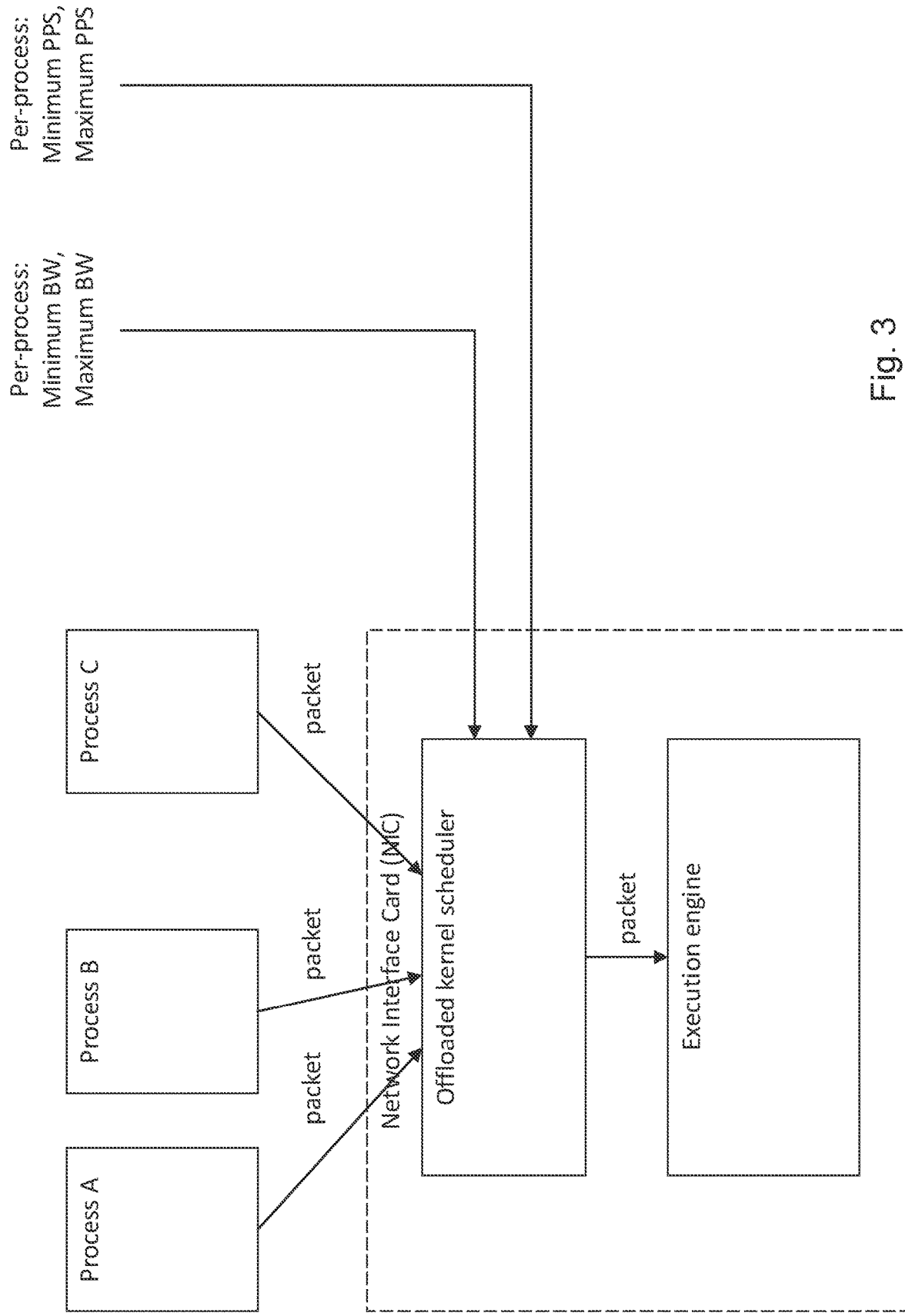
Figure 4:
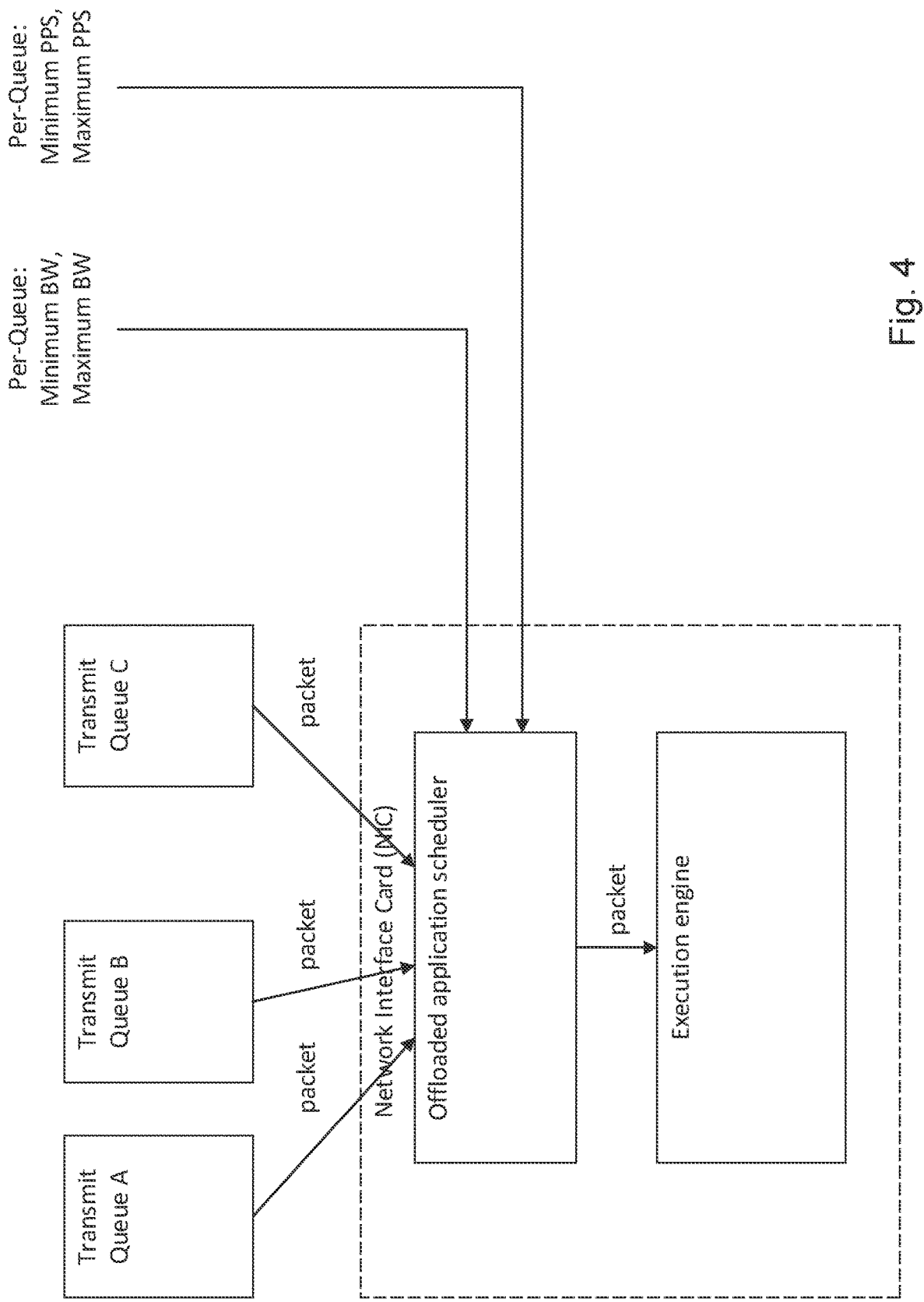
Figure 5:
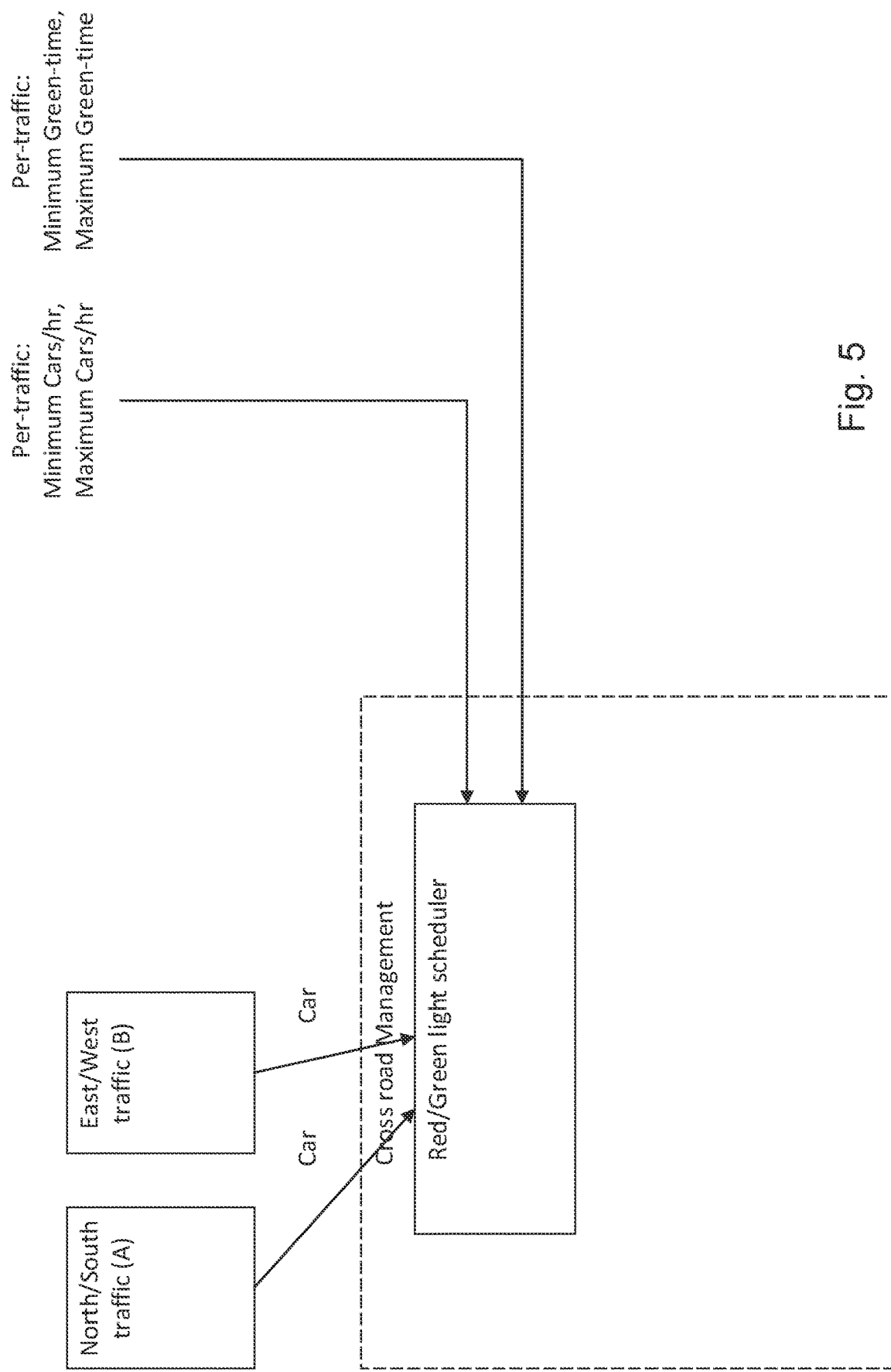
Figure 6:
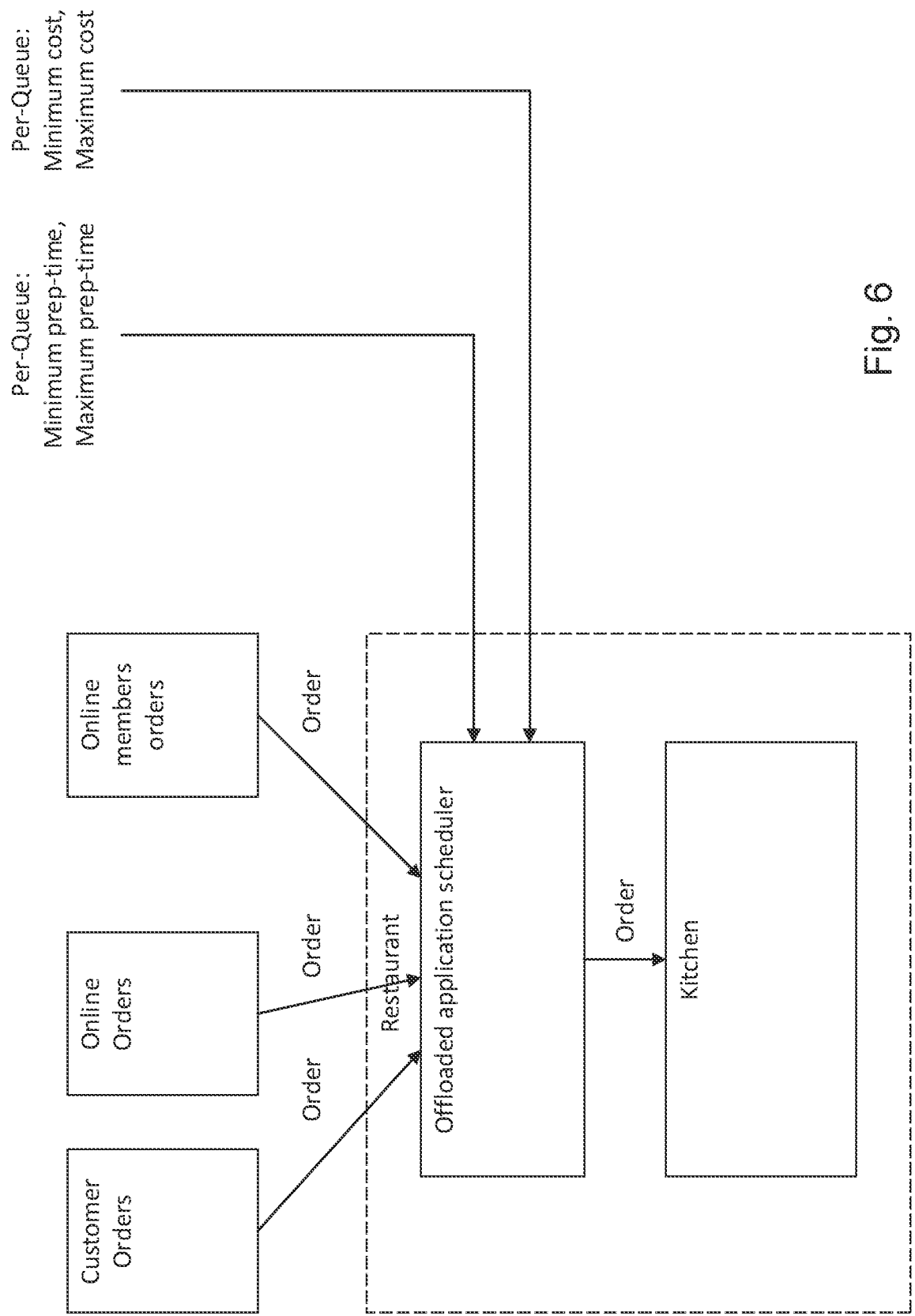

In FIG. 2, the agents are virtual functions, such as SR-IOV virtual functions. In FIG. 3 the agents are processes. Any application may run on each of the plural processes, such as, for example, email applications. In FIG. 4 the agents are transmit queues, in FIG. 5 the agents are traffic lanes running in the north/south and east/west directions respectively, and in FIG. 6 the agents are sources of various respective types of orders such as customer orders (at a brick and mortar facility e.g.), online orders (via a website e.g.) and online members' orders (via a members' login on the website e.g.). Each agent has a queue of jobs, aka a submission queue, which are submitted to a job execution engine which is joint to (shared by) all agents. In FIGS. 1 through 4, each job may comprise a packet which may need to be transmitted over a network. In FIG. 5 each job may comprise a single vehicle, which may be travelling either north/south or east/west. In FIG. 6, each job may comprise an order, which may need to be supplied e.g. by a physical kitchen which serves the plural agents.

The execution engine may comprise any suitable packet execution pipeline logic. This may include all or any subset of the following elements: work descriptor fetch from memory, and/or packet read from memory, and/or packet parsing, and/or packet classification, and/or packet header modification, and/or statistics collection, and/or packet transmission.

As shown by way of example in FIGS. 2, 3 and 4, the scheduler and/or execution engine may reside on a network interface card (NIC). As shown in FIG. 1, the scheduler and/or execution engine may reside on a network switch, aka switching hub, bridging hub, or a MAC bridge. The network switch may include any networking hardware that connects nodes on a computer network, typically using packet switching to receive and forward data to various of the nodes. The switch may also comprise a virtual switch which may be implemented in software and may be offloaded to a network adapter.

As shown, the embodiment of FIG. 3 typically includes an offloaded kernel scheduler. It is appreciated that the Completely Fair Scheduler (CFS) is a process scheduler in the Linux kernel as a default scheduler which handles CPU resource allocation for executing processes, and aims to maximize overall CPU utilization, while also maximizing interactive performance. The CFS manages CPU resources. To manage networking resources, the kernel typically allows an administrator to configure software queues (e.g. Qdiscs, in Linux terminology), mapping logic, and scheduling policy. Typically, the kernel gets networking requests from the processes, maps requests to queues according to the mapping logic, and selects a next request to handle according to the scheduling policy e.g. as described online at the following location: tldp.org/HOWTO/Traffic-Control-tcng-HTB-HOWTO/intro.html. This scheduler may be offloaded (from running in CPU to running in the NIC e.g.) by using NIC work queues and the NIC scheduler.

Figure 7:
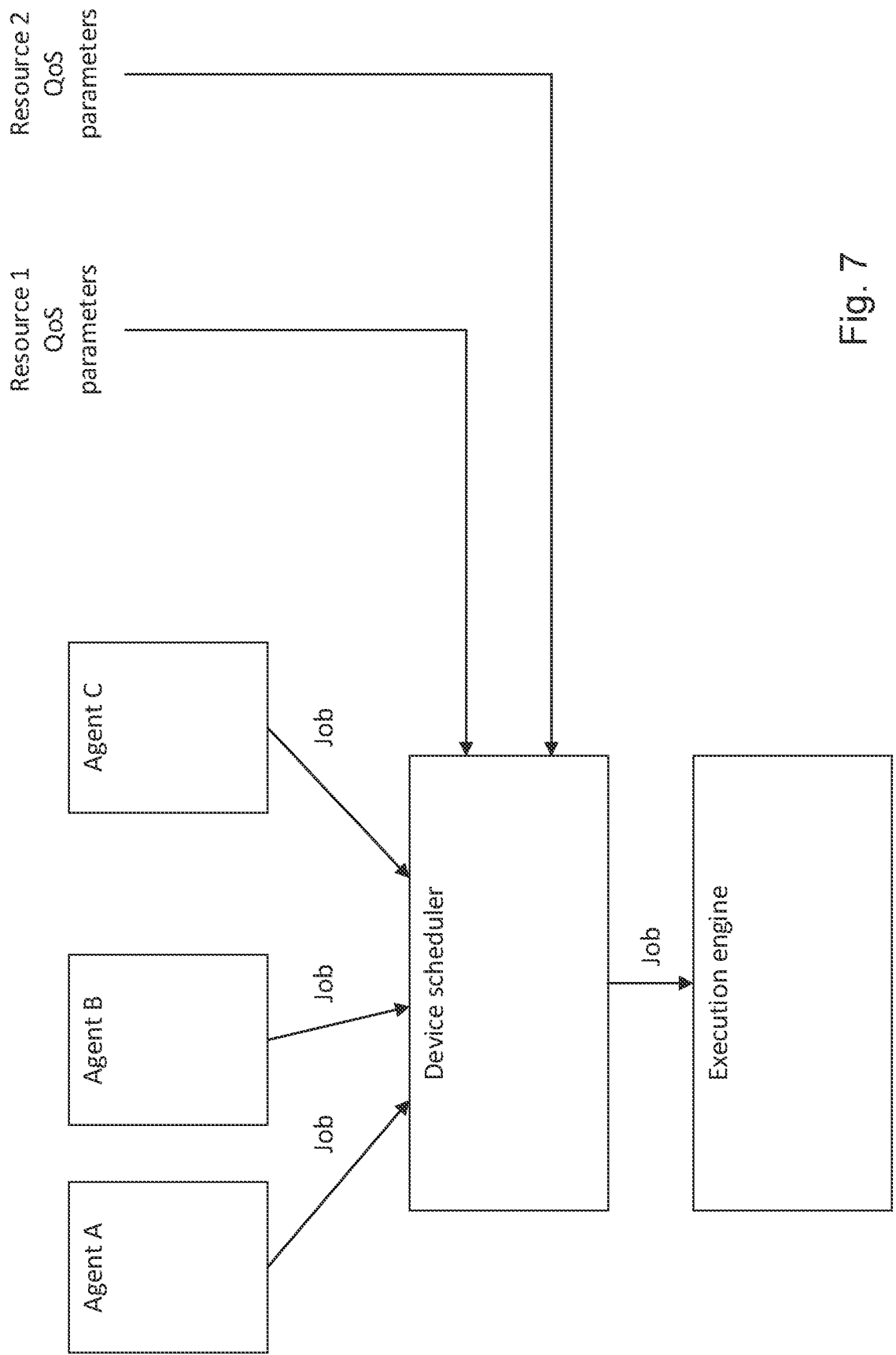
Figure 8:
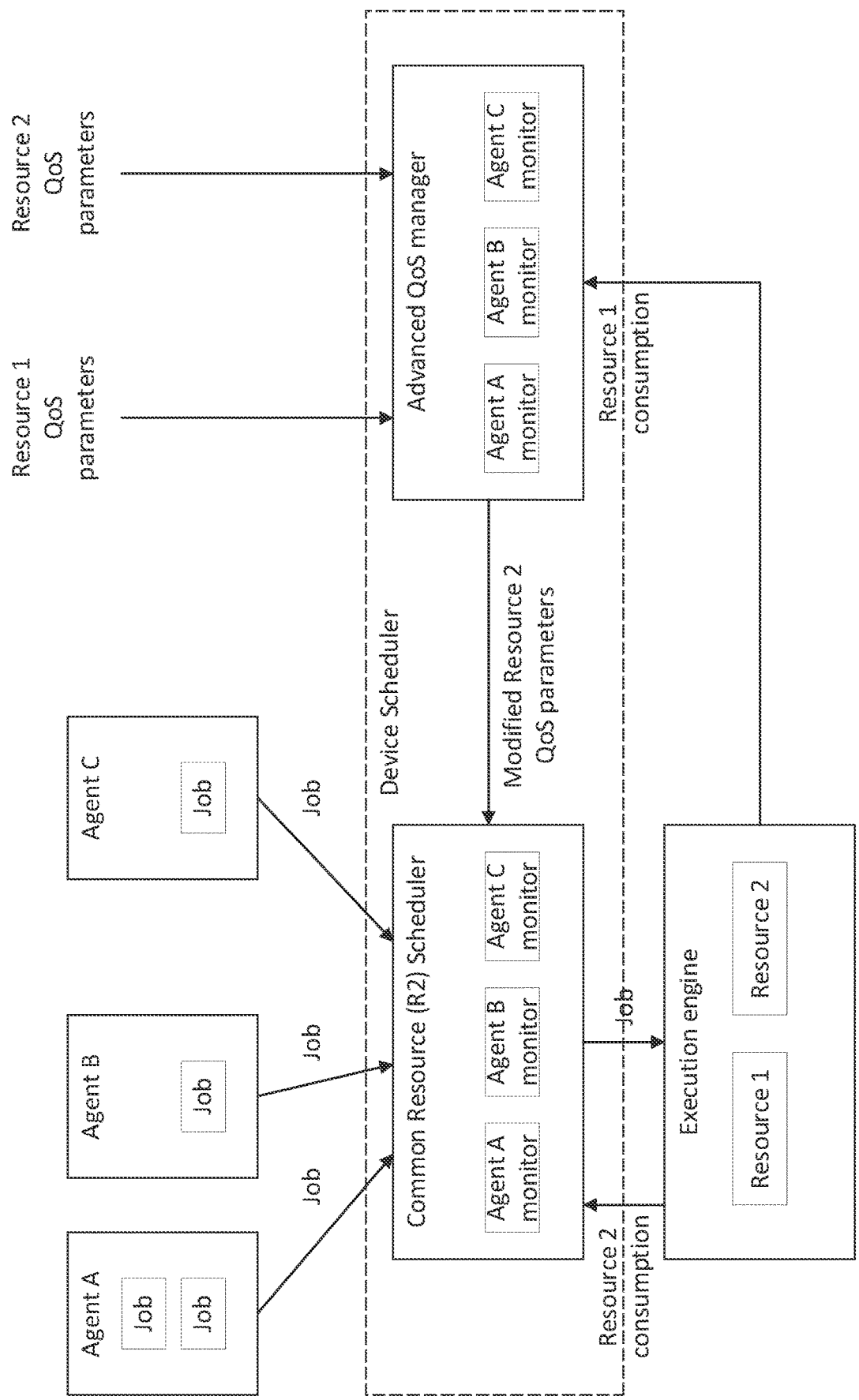

FIG. 7 is a generic block diagram which generalizes the embodiments of FIGS. 1-6, and FIG. 8 is a detailed block diagram illustration of an example implementation of the generalized embodiment of FIG. 7. The functionality which provides a given quality of service according to certain embodiments, may include a QoS manager and/or a common resource scheduler and/or an execution engine, all e.g. as shown in FIG. 8. It is appreciated that in FIG. 8, each agent's submission queue is shown; by way of example only, agent A's queue is shown to include two jobs, whereas there is only one job waiting for each of Agents B and C. The scheduler is split into various resources, one e.g. resource r2, being common to all agents (e.g. resource r2 is used by all agents) and whose allocation among the agents can be controlled, and the other resource(s) e.g. resource r1, being measured, and then, accordingly, indirectly controlled, using modifications (e.g. as described herein) to a common resource scheduler, aka dedicated scheduler, which may manage resource r2. Example: PPS of agent A is measured, and the measurement result indicating how much PPS agent A is using, is compared to the min/max PPS of agent A, and, responsively, at least one QoS parameter e.g. the min and/or max bandwidth, aka BW of agent A, may be modified.

In the diagrams, by way of example, the resources that each agent uses (aka execution resources) are shown to include bandwidth and PPS, and the QoS properties of each of these resources are shown to include the maximal amount of that resource that the agent is allowed to use, and the minimal amount of that resource that is allocated to the agent. Thus each resource has one or more QoS properties defined for each of the agents.

However, it is appreciated that bandwidth (aka network bandwidth (which may include egress and/or ingress) and PPS are but two possible examples of resources. For example, instead of or in addition to PPS being the measured resource, other measured-but-not-controllable resources, aka measurable resources, may, for example, include a number of memory address translations and/or number of crypto-operations.

More generally, resources may include all or any subset of the following resources, which may be either internal or external:

External resources, such as but not limited to:
  Network bandwidth (egress and or ingress)
  Packets per second
  Execution time
  PCIe bandwidth
Internal resources such as but not limited to:
  Number of address translations
  Number of execution engines used
  Size of cached working set e.g. the number of cache misses caused.

The user and/or agent is typically unaware of internal resources, i.e. resources inside the device/system which may be used implicitly by the device. Although internal resources typically cannot be seen by a black box test, or looking at data inputs and outputs of the device, they are still limited resources, and thus an administrator or managing SW may be aware of, and may seek, to control usage of internal resources e.g. to provide a more accurate SLA. External resources, in contrast, are visible to and/or measurable by a user of the system or agent. For example, in an NIC, the device provides network connectivity, thus network BW and PPS are considered external. In the NIC, an accelerator (e.g. encryption engine) may be an example of an internal resource. A user may seek a specific sharing policy between agents, for external resources, however an administrator may seek to apply a given policy for sharing internal resources between agents.

It is appreciated that external resources, as opposed to internal resources, are typically measurable by looking at the system without knowing any implementation details. External resources are typically characteristic of the device and its functionality, so they are common to all implementations of such devices. These characteristics make external resources good candidates for SLAs (service level agreements). Each resource typically has one or more QoS properties defined for each of one or more agents. For example, resource r1 can be PPS, and may have two QoS properties per agent: max PPS which that agent is allowed to use, and the minimum PPS which the system must provide to that agent. Then, resource r2 may be bandwidth, and may also have two properties, or more, or less, including, say, the minimal and/or maximal bandwidths, respectively, assigned to a given agent. Also, measurements are typically generated by the system, for each of one or more resources. Thus, in the example, PPS of agent A is measured, and the measurement result indicating how much PPS agent A is using, is compared to the min/max PPS of agent A, and, responsively, at least one QoS parameter, e.g. the min and/or max bandwidth aka BW of agent A may be modified. It is appreciated that resource/s r1 and/or r2 may be increased, or may be decreased. Alternatively or in addition, the overall resource may be reduced.

Typically, the less tasks or jobs that an agent performs, the less resources are consumed or used by that agent, and vice versa: the more tasks or jobs that an agent performs, the more resources that agent consumes or uses.

It is appreciated that in some embodiments, QoS (e.g. at least one QoS property) may be defined for less than all agents, because at least one of the agents does not have a defined QoS (has zero QoS properties e.g.).

Also, in some embodiments, QoS may be defined in common, for each agent in a subset of agents, where the subset includes plural agents, numbering less than the total number of agents in the system. This may be the case for multiple subsets of the total set of agents in the system. A first QoS may be defined for a first subset, and an n'th QoS may be defined for an n'th subset of the same total set of agents. The subsets may be tree-like e.g. agent 1 & agent 2 can be considered as a single entity, or may be included in a subset for which a given QoS is defined, as opposed to agent 3, which may be a separate entity that is not included in that subset, and, therefore, a different QoS is defined for agent 3.

It is appreciated that usage of r1 by each agent may or may not be known in advance. Also, usage of resource r1 by each agent may or may not vary over time. Also, usage of resource r1 by each agent may or may not be independent of usage by other agents, of the same resource. The relationship between usages of resources r1 and of r2 by a given agent, may or may not be a priori known to the system, and may or not change over time. According to some embodiments, this relationship is known, for at least one agent, or for all agents in the system. However, this relationship may be unknown to the system, and the functionality which provides QoS to subsets of agents, may, at least sometimes, compensate for that. For example, the functionality which provides QoS to subsets of agents may compensate by dynamically computing the relations (e.g. computing that $r1=a*r2$, so as to factor the QoS parameters by parameter a). Alternatively or in addition, the functionality which provides QoS to subsets of agents may compensate by using heuristics (e.g. may compute a score of "deviation from ideal QoS" and use that score as parameter or the factor for modifying r1). The score function may have artificial intelligence, aka AI support, or may be based solely on empirical results.

Any of the above resources may be controlled by hardware. For example, a given hardware may control network bandwidth (both egress and ingress), but not PPS.

An example of translation of bandwidth to PPS, according to an embodiment of the invention, is as follows: the system may measure r2 bandwidth, say in bytes per second. The system may also measure r1 PPS, say in packets per second. If the first quantity is divided by the second, the result is r2/r1=average packet size, which in this example is expressed in bytes per packet.

According to certain embodiments, the system of FIG. 8 comprises the following entities, or, alternatively, the entities may, as below, be provided in isolation:

a. scheduler aka device scheduler which typically selects an agent to serve, based only on a supported policy of resource r2. The scheduler keeps track of all agents' consumptions of resource r2, and uses this information to enforce the policy. The scheduler, as shown in the various illustrated embodiments, may or may not be offloaded, and may comprise a switch scheduler e.g. virtual switch scheduler, or may comprise a kernel scheduler, or may comprise an application scheduler, such as, for example, the red/green light scheduler of FIG. 5, or the resultant scheduler of FIG. 6.

The job from the scheduler-selected agent is typically sent to:

b. An execution engine, which typically provides r2 consumption of the job. The execution engine typically processes the jobs assigned thereto by the scheduler. Processing may include activating sub engines and/or performing tasks consuming internal and external resources, e.g. as described above. For example, a conventional NIC engine may read a packet from host memory and may transmit the packet to the network. While doing the processing, the engine typically reports all resource consumption, per agent, to the scheduler (r2), and to c. a QoS manager, aka advanced QoS manager, which converts the complete QoS policy into a policy supported by the basic scheduler. Typically, the QoS manager uses all resource consumption information from the execution engine to compute the appropriate policy.

It is appreciated that the system of FIG. 8 may be incorporated into any device that handles work/tasks/requests from plural agents, and seeks to service the plural agents according to some policy determining which agent should be serviced, when and/how.

It is appreciated that in the example embodiment of FIG. 1, the device is shown to comprise a network switch, whereas in the example embodiments of FIGS. 2-4, the device is shown to comprise an NIC (network interface card). However, this is not intended to be limiting. More generally, any suitable device servicing plural agents may house or cooperate with the system of the present invention (e.g. the system of FIG. 7 or FIG. 8) such as but not limited to a network adapter, and/or switch, and/or DPU.

If the device comprises a switch, it is appreciated that the switch need not include a hardware switch, and may comprise a software switch, which may be offloaded, say, to an NIC device. It is appreciated that some (in fact many) NICs use work queues to post work requests to the NIC. Thus, if the device comprises an NIC, the plural queues or transmission queues serve as plural agents.

Similarly, an application may be tasked with network related work from plural agents, and may hold a software scheduler. Once this software scheduler chooses which agent to service, the software scheduler may send the work to the NIC. This application may be offloaded, so that the NIC's hardware does some of the application work in the CPU's stead. In this case, the application may be commanded to use an NIC work queue for each agent and to configure the NIC scheduler according to the application policy between the agents. As a result, the application may simply pass the work from the agents to the NIC queues, rather than performing CPU-intense scheduling. Similarly, rather than having an application managing agents, an OS kernel may be provided to service plural processes. The OS (operating system) kernel may have its own mechanisms to schedule processes to the CPU, but, for networking, the OS kernel may allow each process its own network queues, and may configure a policy to the NIC scheduler to control network usage instead of implementing the same in the CPU, in software.

The following is an example flow for a QoS management method provided in accordance with certain embodiments. The flow may be performed, typically periodically, by the QoS manager of FIG. 8, and may include all or any subset of the following operations, suitably ordered e.g. as follows:

Operation a: collect and/or monitor information for all agents and all resources, by receiving measurements of each agent's usage of each resource.

Operation b: for each agent x, compute agent x's r2 requirement depending on agent x's level of utilization (aka usage), as measured, of resources r1 and r2.

Operation c: modify r2 requirement configuration of the scheduler, using an interface function, such as but not limited to a kernel call, and a PCI configuration cycle. In some embodiments this interface may be between agent and kernel, or between agent/kernel and a PCI device. It is appreciated that, similarly, such interface functions may be used by the QoS manager to collect information.

Any suitable method may be used, to perform operation b, such as the following three example methods:

Direct Computation Method for Performing Operation b:

For a previous period or time-window, which may include the interval of time since operation C was last performed, compute the following:

i. compute a ratio CR=CR2/CR1 between:
utilization of r1 by agent x during the previous period aka consumed r1 resources (CR1)
and
utilization of r2 by agent x during the previous period aka consumed r2 resources (CR2).

ii. compute QoS parameters for r1 (MaxR1, MinR1) in terms of r2, using the SLA QoS parameters (OrigMaxR1, OrigMinR1) for r1. The computation may be:

MaxR1=CR*OrigMaxR1,

MinR1=CR*OrigMinR1.

iii. compute modified parameters for r2:

MaxR2=minimum(OrigMaxR2, MaxR1),

MinR2=minimum(MaxR2, maximum(OrigMinR2, MinR1))

Increase/Decrease Computation for Performing Operation b:

For a previous period or time-window, which may include the interval of time since operation C was last performed, determine all or any suitable subset of the following:

i. Is agent x exceeding? This determination may be made by computing whether the following is true: (OrigMaxR1<CR1) OR (OrigMaxR2<CR2)?

If yes decrease r2's QoS parameter by a factor e.g. MaxR2*=alpha, where 0<alpha<=1.

ii. Is agent x deprived? This determination may be made by computing whether the following is true: (OrigMinR1>CR1) OR (OrigMinR2>CR2), if yes increase r2's QoS parameter by a factor e.g. MinR2*=beta, iii. Is the system fully utilized? This determination may be made by computing whether the following is true: the sum of all agents CR1 is equal to total available R1 or the sum of all agents CR2 is equal to total available R2. If the system is not fully utilized and the agent is not exceeding, then increase the r2 parameter by a factor e.g. MaxR2*=gamma. Typically, gamma is between 1 and 2.

iv. Are the new values consistent? This determination may be made by computing whether the following is true: (MaxR2>MinR2). If the new values are not consistent, MinR2 may be adjusted to the same value as MaxR2.

AI-Based Method, for Performing Operation b:

In a set-up stage, train an AI e.g. by providing knowledge that has accumulated on the relationship between bandwidth and PPS e.g. in real scenarios, sing a score function that evaluates how much agents did not meet their QoS parameters, and how much under-utilization has occurred.

In run time, provide the following parameters to the trained AI logic: CR1, CR2, OrigMaxR1, OrigMinR1, OrigMaxR2, OrigMinR2, MinR2, MaxR2, Total R1, total R2. More specifically:

CR1 is utilization of resource r1 by agent x during a previous period
CR2 is utilization of resource r2 by agent x during a previous period
OrigMaxR1, OrigMinR1 are the original QoS parameters for r1.
OrigMaxR2, OrigMinR2 are the original QoS parameters for r2.
Total R1 is the total sum of amounts of resource r1, that can be allocated to all agents.
Total R2 is the total sum of amounts of resource r2, that can be allocated to all agents.
Responsively, the AI logic computes a new MinR2 and a new MaxR2.

According to certain embodiments, on at least one occasion when too much of resource r1 is found, by the functionality which provides QoS to subsets of agents, to have been allocated to agent A considering the given quality of service, the functionality, responsively, indirectly decreases resource r1, by decreasing resource r2.

According to certain embodiments, on at least one occasion when too little of resource r1 is found, by the functionality which provides QoS to subsets of agents, to have been allocated to agent A considering the given quality of service, the functionality, responsively, indirectly increases resource r1, by increasing resource r2.

According to certain embodiments, on at least one occasion when too much of resource r1 is found, by the functionality which provides QoS to subsets of agents, to have been allocated to agent A considering the given quality of service, the functionality, responsively, indirectly decreases resource r1, by increasing resource r2.

According to certain embodiments, on at least one occasion when too little of resource r1 is found, by the functionality which provides QoS to subsets of agents, to have been allocated to agent A considering the given quality of service, the functionality, responsively, indirectly increases resource r1, by decreasing resource r2.

Typically, if agent A gets more than MIN PPS, and less than MAX PPS, this is considered neither too much, nor too little. Alternatively, however, this situation may be considered too little.

Figure 9:
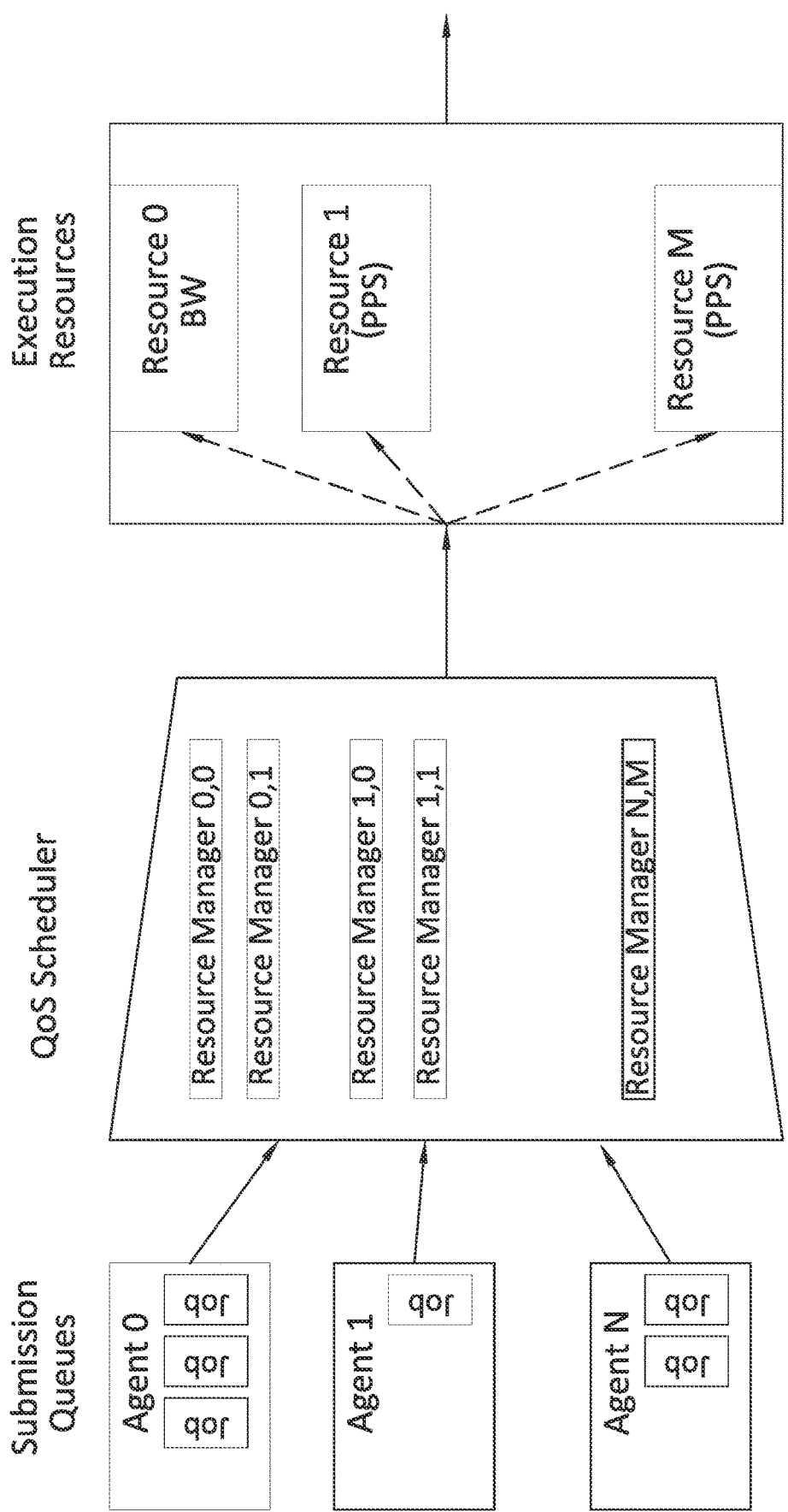
Figure 10:
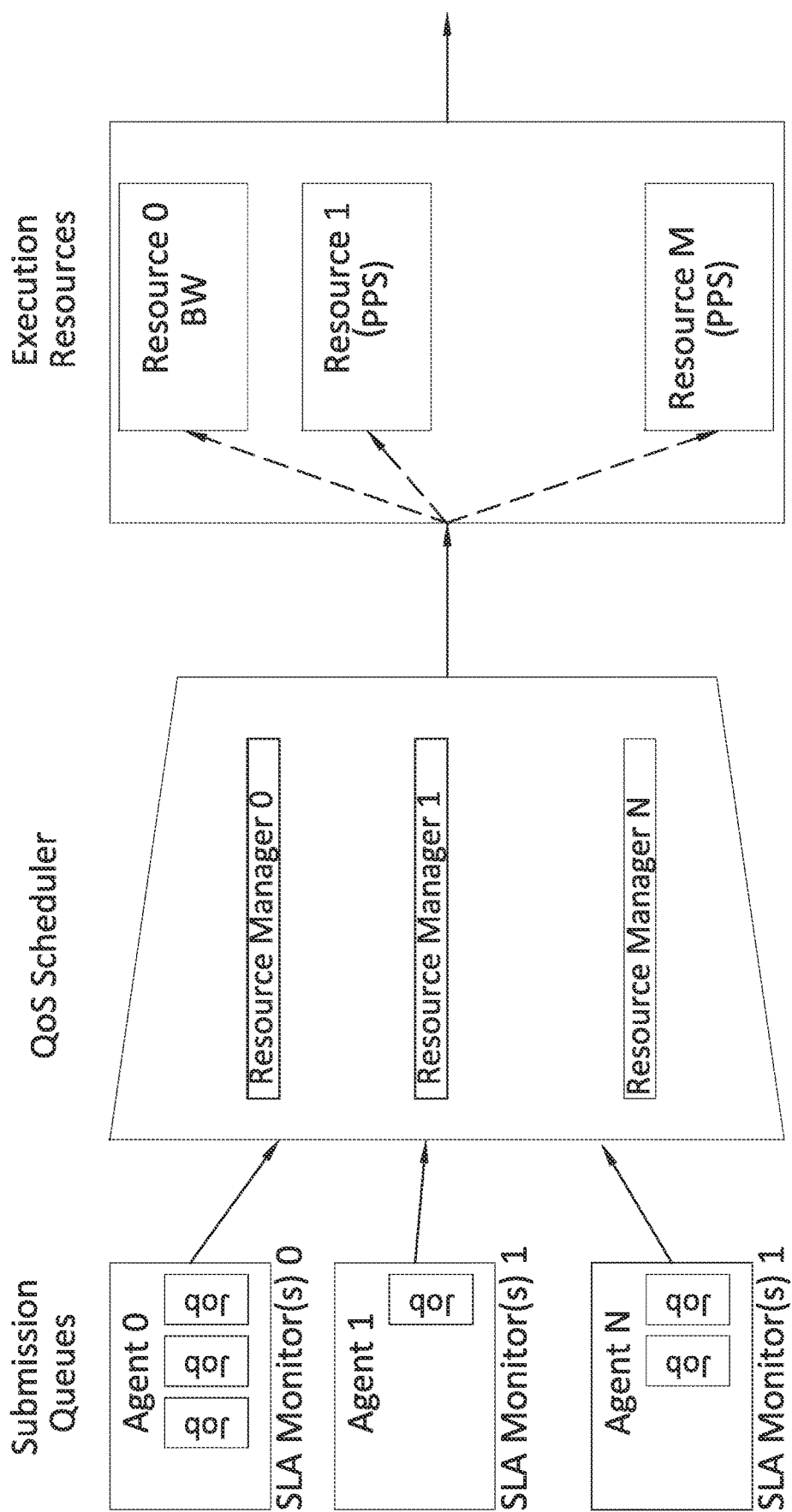

FIG. 9 is a conceptual illustration of a scheduler which may include a separate manager for each of the M resources and for each of the N agents. The scheduler of FIG. 9 manages all resources for all agents and knows how to apply the entire policy. FIG. 10 is a more limited scheduler which includes one joint manager (e.g. bandwidth manager) for plural resources 0, . . . M, however one such manager may be provided for each of plural SLA monitors 0, . . . , N corresponding respectively to plural agents 0, . . . N. By using methods shown and described herein, the more limited scheduler of FIG. 10 may also be used to manage all resources for all agents and to apply the entire policy.

One possible parameter for modifying r2 is the overall usage of r1, by all agents. For example, looking at PPS, perhaps all agents are below their maximum QoS (aka MAX PPS), and above their minimum QoS. However, summing all agents' PPS yields an overall value which is lower than the potential PPS of the device which services the plural agents. In such a case the maximal bandwidth for some agents may be increased, to try to achieve full utilization, without exceeding MAX PPS values.

An advantage of certain embodiments is that the system does not necessarily assume that the only network adapter and/or switch and/or DPU bottleneck is link bandwidth.

It is appreciated that there may be a single controlled resource r2 which is common to all agents, or there may be plural such resources. Alternatively or in addition, there may be a single measured resource r1 which the system does not have the capability to control (other than implicitly or indirectly, e.g. as described herein), or there may be plural such resources.

Embodiments herein have a wide variety of applications, such as enhancing operation of larger systems. Such larger systems include, just by way of example, the Mellanox ConnectX®-5, ConnectX®-6dx, ConnectX®-7 or other Ethernet network adaptor cards, or data processing units (DPUs) such as NVIDIA® BlueField® units including BlueField®-1, BlueField®-2. For example, in any of these, a user-space application may be provided that allows or accommodates QoS parameters described herein and implements functionality herein. Alternatively or in addition, firmware in such large systems may be modified to yield firmware which allows or accommodates QoS parameters described herein and implements functionality herein. In this case, APIs of these larger systems may be exposed, inter alia, to the kernel.

Artificial intelligence functionality described herein may be provided by any suitable AI system/s, such as but not limited to NVIDIA®'s DGX. This AI system may for example include a purpose-built computing system (e.g., a super-computer or an HPC aka high performance computer) configured for inferencing and/or for deep learning and/or for machine learning, and/or other artificial intelligence tasks. The AI system may include GPU-optimized software (e.g., a software stack) that may be executed using a plurality of GPUs, in addition to CPUs and/or RAM and/or other components, features, or functionality. In at least one embodiment, AI systems/s may be implemented in a cloud (e.g., in a data center) for performing AI processing tasks. The cloud may include a GPU-accelerated infrastructure (e.g., NVIDIA®'s NGC) that may provide a GPU-optimized platform for executing artificial intelligence processing. The cloud may perform AI-based task/s as a hardware abstraction and scaling platform. The cloud may integrate with application orchestration functionality (e.g., a suitable platform for managing containerized workloads and services such as Kubernetes) which enables plural GPUs to providing seamless scaling and load balancing between and among applications and services serving the artificial intelligence functionality. The cloud may perform small and large batch inference (e.g., executing NVIDIA®'s TENSOR RT), may provide an accelerated parallel computing API and platform (e.g., NVIDIA®'s CUDA), may provide a graphics rendering API and platform (e.g., for ray-tracing and/or 2D and/or 3D graphics, and/or other rendering techniques e.g. to produce cinematics).

It is appreciated that software components of the present invention may, if desired, be implemented in ROM (read only memory) form. The software components may, generally, be implemented in firmware or hardware, if desired, using conventional techniques. It is further appreciated that the software components may be instantiated, for example: as a computer program product, or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment, may also be provided separately, or in any suitable sub-combination.

It will be appreciated by persons skilled in the art that the present invention is not limited by what has been particularly shown and described hereinabove. Rather, the scope of the invention is defined by the appended claims and equivalents thereof.

The invention claimed is:

1. A system which facilitates efficient operation of plural agents, the system comprising:
    a physical network device which services the plural agents; and
    functionality which provides a given quality of service, defined in terms of at least one resource, to at least one subset of agents from among the plural agents, wherein the at least one subset of agents comprises more than one and less than all of the plural agents, and wherein usage of the at least one resource by the at least one subset of agents is measured for the at least one subset of agents, and then used to indirectly vary the at least one resource provided to the at least one subset of agents by directly controlling another resource provided to the at least one subset of agents, wherein said at least one resource comprises packets per second (PPS), wherein said functionality is located externally with respect to the physical network device, and wherein the another resource which the physical network device is configured to directly control is located internally with respect to the physical network device.

2. A system according to claim 1 wherein the quality of service is defined in terms of at least one resource r1, allocation of which, to at least some of the plural agents, the physical network device which services the plural agents is not configured to control, but level of usage of which, by each of at least some of the plural agents, the physical network device is configured to measure, and therefore to determine whether or not a level of resource r1 provides the given quality of service.

3. A system according to claim 2 wherein said at least one resource r1, usage of which the physical network device which services the plural agents are configured to measure, but the allocation of which, to the plural agents, the physical network device is not configured to control, is varied indirectly by said functionality, by controlling another resource r2 whose allocation to the plural agents the physical network device is configured to control.

4. A system according to claim 1 wherein the functionality, at least once, measures how much of at least one resource r1 is allocated to at least one agent A from among the plural agents, identifies that an incorrect amount of resource r1 has been allocated to agent A considering the given quality of service, and, responsively, indirectly varies resource r1, by controlling resource r2.

5. A system according to claim 3 wherein a relationship between usage of resource r2 by at least one agent A, with usage of resource r1 by said agent A, is known.

6. A system according to claim 1 wherein artificial intelligence is used to learn a relationship of r2 with r1.

7. A system according to claim 5 wherein the known relationship of r2 with r1 is that r1 is, at least in some known conditions, a decreasing function of r2 such that, at least given said known conditions, when r2 increases, r1 decreases, and when r2 decreases, r1 increases.

8. A system according to claim 5 wherein the known relationship of r2 with r1 is that r1 is, at least in some known conditions, an increasing function of r2 such that at least given said known conditions, when r2 increases, r1 increases and when r2 decreases, r1 decreases.

9. A system according to claim 6 wherein said functionality which provides QoS to at least one subset of agents, at least once dynamically computes said relationship, and modifies at least one QoS parameter accordingly.

10. A system according to claim 6 wherein said functionality which provides QoS to at least one subset of agents uses at least one heuristic and modifies at least one QoS parameter accordingly.

11. A system according to claim 1 wherein said resource which the physical network device is configured to control comprises bandwidth.

12. A system according to claim 1 wherein at least one of said agents comprises a virtual machine.

13. A system according to claim 1 wherein at least one of said agents comprises a physical computer.

14. A system according to claim 1 and wherein the physical network device comprises a switching device which includes a physical network switch on which the functionality resides.

15. A system according to claim 1 and wherein the physical network device comprises a switching device which includes a virtual network switch on which the functionality resides.

16. A system according to claim 1 wherein the quality of service includes a minimum amount of the resource, which is always provided to each agent in a given subset of said plural agents.

17. A system according to claim 1 wherein the quality of service includes a maximum amount of the resource, which the amount of the resource used by each agent in a given subset of said plural agents, must not exceed.

18. A method which facilitates efficient operation of plural agents operating in conjunction with a network device which services the plural agents, the method comprising:
    providing functionality which provides a given quality of service; and using said functionality to provide quality of service defined in terms of at least one resource, to each individual agent from among the plural agents, wherein the quality of service is defined in terms of at least one resource r1, allocation of which, to more than one and less than all of the plural agents, the device cannot control, but level of usage of which, by the more than one and less than all of the plural agents, the device is configured to measure, and therefore to determine whether or not a level of resource r1 provides the given quality of service, and wherein said quality of service is provided when the at least one resource r1, is varied indirectly by said functionality, by controlling another resource r2 whose allocation to the plural agents the network device is configured to directly control, wherein said functionality is located externally with respect to the network device, and wherein said another resource r2 is located internally with respect to the network device.

19. A system according to claim 4 wherein a relationship of r2 with r1 is known to the functionality, thereby to define a known relationship of r2 with r1.

20. A system according to claim 19 wherein the known relationship of r2 with r1 is that r1 is, at least in some known conditions, an increasing function of r2, such that at least given said known conditions, when r2 increases, r1 increases, and when r2 decreases, r1 decreases.

21. A system according to claim 1 wherein at least one of said plural agents comprises a network port.

22. A system according to claim 1 wherein at least one QoS property is defined in common, for all agents in a subset of agents, where the subset includes less than a total number of agents in the system.

23. A system according to claim 1 wherein resource r2 is used by all tasks from all agents in the system.

* * * * *